United States Patent
Sarraf

[11] Patent Number: 5,879,473
[45] Date of Patent: Mar. 9, 1999

[54] RARE EARTH EMITTER

[75] Inventor: David B. Sarraf, Elizabethtown, Pa.

[73] Assignee: Thermal Corp., Georgetown, Del.

[21] Appl. No.: 791,375

[22] Filed: Jan. 30, 1997

[51] Int. Cl.$^6$ ............................................. H01L 31/00
[52] U.S. Cl. ............................................. 136/253
[58] Field of Search ............................................. 136/253

[56] References Cited

U.S. PATENT DOCUMENTS

| | | | |
|---|---|---|---|
| 3,751,303 | 8/1973 | Kittl | 136/257 |
| 3,929,510 | 12/1975 | Kittl | 136/253 |
| 4,976,606 | 12/1990 | Nelson | 136/253 |
| 5,080,724 | 1/1992 | Chubb | 136/253 |
| 5,360,490 | 11/1994 | Nelson | 136/253 |
| 5,495,978 | 3/1996 | Muth | 228/122.1 |

*Primary Examiner*—Mark Chapman
*Attorney, Agent, or Firm*—Martin Fruitman

[57] ABSTRACT

The apparatus is a selective radiation emitter to be used in conjunction with a photocell for thermophotovoltaic generation of electricity from heat. One embodiment of the emitter is a layer of selectively radiating rare earth oxide bonded onto a heated base metal layer by the use of an intermediate thin layer of porous metal powder. Another embodiment is an emitter of a thick metal powder layer combined with a rare earth oxide which is formed into the voids in the metal powder structure and bonded to a metal substrate which is to be heated. In this embodiment the metal powder grains are gold plated to limit their emissivity, so that emission outside the desired band of the rare earth oxide is greatly reduced.

2 Claims, 1 Drawing Sheet

RARE EARTH EMITTER

BACKGROUND OF THE INVENTION

This patent deals generally with batteries and more specifically with an emitter for a thermophoto electric generator.

Thermophotovoltaic cells are used to convert thermal energy into electrical energy by heating an emitter to a temperature at which it becomes incandescent and directing the radiation from the incandescent emitter to a photovoltaic cell. Although the energy conversion actually can take place with very simple devices, even as simple as a candle and a photocell, the practical use of such systems depends upon increasing the efficiency of the energy conversion. Very few devices are presently available which have efficiencies high enough to make them suitable for use in generating usable electrical energy.

Essentially, the problem is that most heated materials emit radiation over a very broad spectrum, and that photovoltaic cells have a very narrow band of sensitivity. Although selective filters have been used to limit the band of radiation to which the photovoltaic cell is subjected, these filters are very fragile and require flame shields when used with flame fired systems. Ideally, a selective radiator is needed which only emits radiation in the same narrow band to which the photovoltaic cell responds.

It is already known that certain rare earth oxides emit radiation in a single narrow band in the infrared spectrum when they are heated. These oxides of the rare earth elements, such as erbium, holmium, neodymium, and ytterbium, exhibit peak radiation in a narrow band, and their emittance approaches zero elsewhere, and, fortunately, their band of emission closely matches the band of sensitivity of photovoltaic cells.

However, there is considerable difficulty in heating rare earth oxides in practical devices. The heating process always involves also heating other materials in order to transfer the heat to the rare earth oxides, and these other materials and the bonds to the other materials have experienced mechanical failures due to thermal stress.

SUMMARY OF THE INVENTION

The present invention is a selective emitter to be used in conjunction with a photovoltaic cell for thermophotovoltaic generation of electricity from heat, and the emitter of the invention greatly limits the band in which radiation is generated. The preferred embodiment of the invention is an emitter which uses a thin metal powder layer to bond a thicker layer of the rare earth oxide to the heated metal base substrate. The rare earth oxide layer in the structure and the metal powder layer are hot isostatically pressed to the metal base layer, and the rare earth oxide layer is made thick enough so that it is opaque to the radiation from the underlying layer of powdered metal and from the solid metal base substrate. The radiation emitted from these layers below the rare earth layer is thereby absorbed by the rare earth oxide, and, in fact, aids in heating the rare earth oxide layer to its required temperature. The radiation emitted from such an emitter is essentially only from the rare earth oxide.

An alternate embodiment of the invention includes a relatively thick metal powder porous layer bonded to the metal substrate which is to be heated, with the selective emission rare earth oxide impregnated into the voids in the porous metal powder structure. The metal powder grains are also gold plated to greatly reduce their emissivity, so that emission by the metal powder, which is outside the desired radiation band generated by the rare earth oxide, is greatly reduced.

Thus, this alternate embodiment of the invention begins to approach the ideal emitter in which the thermal energy produces radiation in only the exact band to which the photovoltaic cell will react.

The present invention thereby yields emitters which are capable of very selective narrow band radiation, and provide practical, high efficiency, thermophotovoltaic generation of electricity.

DETAILED DESCRIPTION OF THE INVENTION

Figure 1:
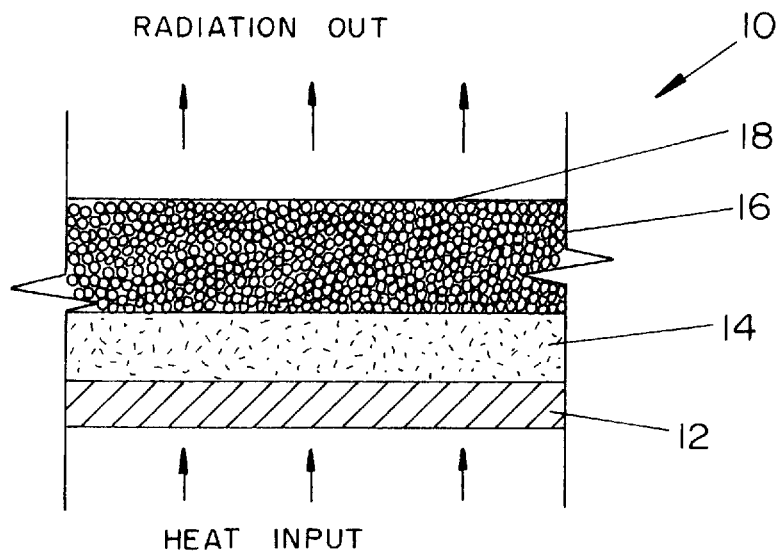
FIG. 1 is a representative cross section view through the thickness of a portion of the structure of the preferred embodiment of the rare earth emitter of the invention.

FIG. 1 is a representative cross section view through the thickness of a portion of the structure of the preferred embodiment of rare earth emitter 10 of the invention. As can be appreciated from the simplicity of the drawing, emitter 10 has only three layers.

Metal base substrate 12 is the layer which is heated. It can be heated by any available means, including fossil fuel heating or solar radiation.

Porous powder metal layer 14 is an intermediate layer used to bond rare earth oxide layer 16 to heated metal layer 12. Porous powder metal layer 14 is a sintered metal powder layer which is compliant enough to accommodate to the different coefficients of thermal expansion of layers 12 and 16. The use of such an intermediate layer permits repeated heating of the rare earth oxide layer to operating temperature and subsequent cooling without failure of the bond.

In one embodiment of the invention shown in FIG. 1, Inconel 800 or Haynes Alloy 214 is used for base layer 12 which is 1 mm thick. Both these materials have proven to be structurally sound and oxidation resistant. Angular nickel powder with a grain size of 150 mesh (0.004 inch) is used for porous metal powder layer 14, and is formed into a layer two to three mm thick. Holmia with a grain size of −325 mesh (0.0012 inch or less) is the rare earth oxide of layer 16 which is two to three mm thick. The two layers 14 and 16 are hot isostatically pressed onto metal base substrate 12.

When holmia is heated to 1100 degrees centigrade it exhibits an emission band with a peak at 2.0 microns wavelength. That peak is a nearly ideal match to the band of sensitivity of InGaAs photovoltaic cells. Furthermore, the thickness of rare earth oxide layer 16 is sufficient so that it is opaque to the broad band radiation produced by layers 12 and 14, so only the narrow band radiation of rare earth oxide layer 16 is produced on output side 18 of rare earth oxide layer 16.

Figure 2:
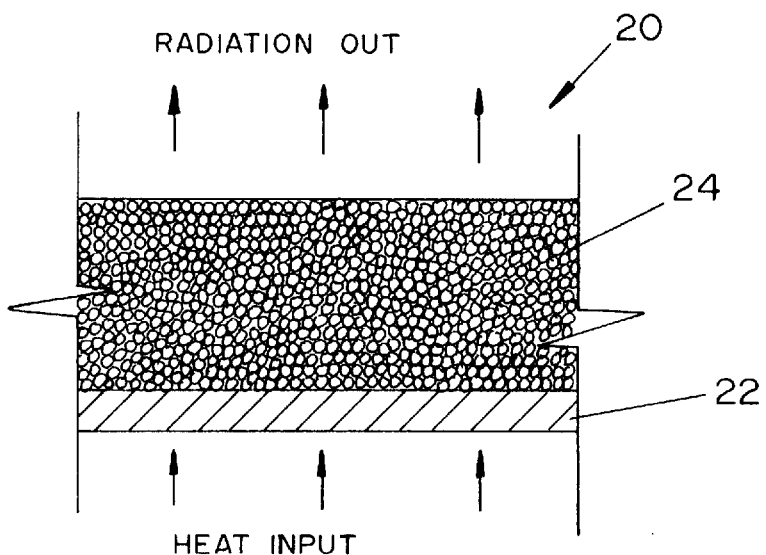
FIG. 2 is a representative cross section view through the thickness of a section of the structure of an alternate embodiment of the rare earth emitter of the invention.

FIG. 2 is a representative cross section view through the thickness of a section of the structure of an alternate embodiment, rare earth emitter 20, of the invention. Rare earth emitter 20 has only two layers. One layer is heated metal base layer 22, and the second layer is layer 24 which is a combination of gold plated metal powder and rare earth oxide. Combination layer 24 is 5 mm thick and is made with the rare earth oxide of, for instance, holmia of a grain size of −325 mesh (0.0012 inch or less), plated with a 0.001 inch thick coating of gold, and metal powder of, for instance, angular nickel of 150 mesh (0.004 inch) grain size, and is pressed onto 1 mm base layer 22 of Inconel 800 or Haynes Alloy 214.

Emitter 20 of FIG. 2 operates at essentially the same conditions as does emitter 10 of FIG. 1. At 1100 degrees centigrade, the holmia of emitter 20 radiates at a peak at 2.0 microns wavelength, and the gold plating on the nickel powder severely limits any spurious radiation from that material.

The present invention thereby furnishes emitters for the thermophotovoltaic generation of electricity which are capable of very selective narrow band radiation, and provide practical, high efficiency.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other rare earth oxides may, of course, be used, and, similarly, other metal base substrates and porous metal powders may be used. The choices of such materials will be largely dependent upon the environment and the temperatures at which the the emitter is required to operate.

What is claimed as new and for which Letters Patent of the United States are desired to be secured is:

1. An emitter for a thermophotovoltaic energy converter comprising:
    a metal base substrate;
    a metal powder layer bonded to the metal base substrate; and
    a rare earth oxide layer bonded to the metal powder layer, with the thickness of the rare earth oxide layer great enough to cause the rare earth oxide layer to be opaque to radiation from the metal powder layer and the metal base substrate when the emitter is heated.

2. An emitter for a thermophotovoltaic energy converter comprising:
    a metal base substrate;
    a metal powder layer bonded to the metal base substrate with the grains of metal powder coated with gold; and
    a rare earth oxide mixed into the metal powder layer to form a combined layer of gold covered metal powder and rare earth oxide, so that the radiation from the metal powder is reduced when the emitter is heated.

\* \* \* \* \*